United States Patent [19]

Arai

[11] Patent Number: 4,910,378

[45] Date of Patent: Mar. 20, 1990

[54] BEAM BENDER FOR USE IN A LASER-BEAM MACHINING APPARATUS

[75] Inventor: Takeji Arai, Minamitsuru, Japan

[73] Assignee: Fanuc Ltd, Minamitsuru, Japan

[21] Appl. No.: 348,038

[22] PCT Filed: Sep. 3, 1988

[86] PCT No.: PCT/JP88/00894

§ 371 Date: Apr. 21, 1989

§ 102(e) Date: Apr. 21, 1989

[87] PCT Pub. No.: WO89/02337

PCT Pub. Date: Mar. 23, 1989

[30] Foreign Application Priority Data

Sep. 16, 1987 [JP] Japan ................. 62-231855

[51] Int. Cl.⁴ .......................................... B23K 26/06
[52] U.S. Cl. .................. 219/121.74; 219/121.78; 350/633; 350/486
[58] Field of Search ............. 219/121.74, 121.73, 219/121.75, 121.78, 121.79, 121.80; 350/633, 486, 634, 636, 321, 632

[56] References Cited

U.S. PATENT DOCUMENTS

| 3,424,413 | 1/1969 | Applegate .................. 350/634 X |
| 3,588,232 | 6/1971 | Mostel ............................ 350/633 |
| 4,667,080 | 5/1987 | Jüptner et al. .............. 219/121.74 |
| 4,695,701 | 9/1987 | Monteith et al. ......... 219/121.74 X |

*Primary Examiner*—C. L. Albritton
*Attorney, Agent, or Firm*—Staas & Halsey

[57] ABSTRACT

A beam bender for varying the direction of a laser beam in a laser-beam machine apparatus which comprises a mirror holder (6) having therein a mirror holder member (10) fitted in an inner bearing race (14) having an outer spherical surface. The inner bearing race (14) is coupled to an outer bearing race (16) either through balls 15a, 15b or directly, the outer bearing race (16) having an inner spherical surface. The inner bearing race (14) is spherically rotatable with respect to the outer bearing race (16). The angle of inclination of a bender mirror (7) held by the mirror holder member (10) can be adjusted without moving the center of the reflecting surface of the bender mirror (7).

6 Claims, 2 Drawing Sheets

BEAM BENDER FOR USE IN A LASER-BEAM MACHINING APPARATUS

TECHNICAL FIELD

The present invention relates to a beam bender for changing the direction of a laser beam in a laser-beam machining apparatus, and more particularly to a beam bender which can vary the inclination of a bender mirror without moving the center of the bender mirror.

BACKGROUND ART

In laser-beam machining, a laser beam produced by a laser oscillator is deflected by a beam bender and then focused onto a workpiece by a lens. The angle of the beam bender is adjusted by angularly adjusting the mirror holder with three or four micrometers.

The angular adjustment of the mirror holder requires a lot of skilled work. Even if the angle of the mirror holder is adjusted, the bender mirror may be positionally displaced, thus displacing a spot which is irradiated by a laser beam defected by the bender mirror. It has been very difficult to adjust both the angle and position of the bender mirror with accuracy.

DISCLOSURE OF THE INVENTION

It is an object of the present invention to provide a beam bender which will solve the above problems and can vary the inclination of a bender mirror without moving the center of the bender mirror.

To solve the above problems, there is provided in accordance with the present invention a beam bender for changing the direction of a laser beam in a laser-beam machining apparatus, comprising:

light-guide member for passing a laser beam therethrough;

a mirror holder fixed to said light-guide member and having fine adjustment mechanism for adjusting the direction of a bender mirror, said mirror holder having a mirror holder member therein which holds said bender mirror;

an inner race in which said mirror holder member is fitted, said inner race having an outer spherical surface; and an outer race coupled to said inner race directly or through balls and having an inner spherical surface, said inner race being spherically rotatable with respect to said outer race about a point on the central axis of the inner race, said point being aligned with the center of a reflecting surface of the bender mirror.

The mirror holder member holding the bender mirror is fitted in the inner race, and the inner race is confined by the outer race so as to be rotatable about the center of the reflecting surface of the bender mirror. Therefore, the center of the reflecting surface of the bender mirror remains immovable, and only the angle of inclination of the bender mirror ca be adjusted.

BEST MODE FOR CARRYING OUT THE INVENTION

An embodiment of the present invention will hereinafter be described with reference to the drawings.

Figure 1:
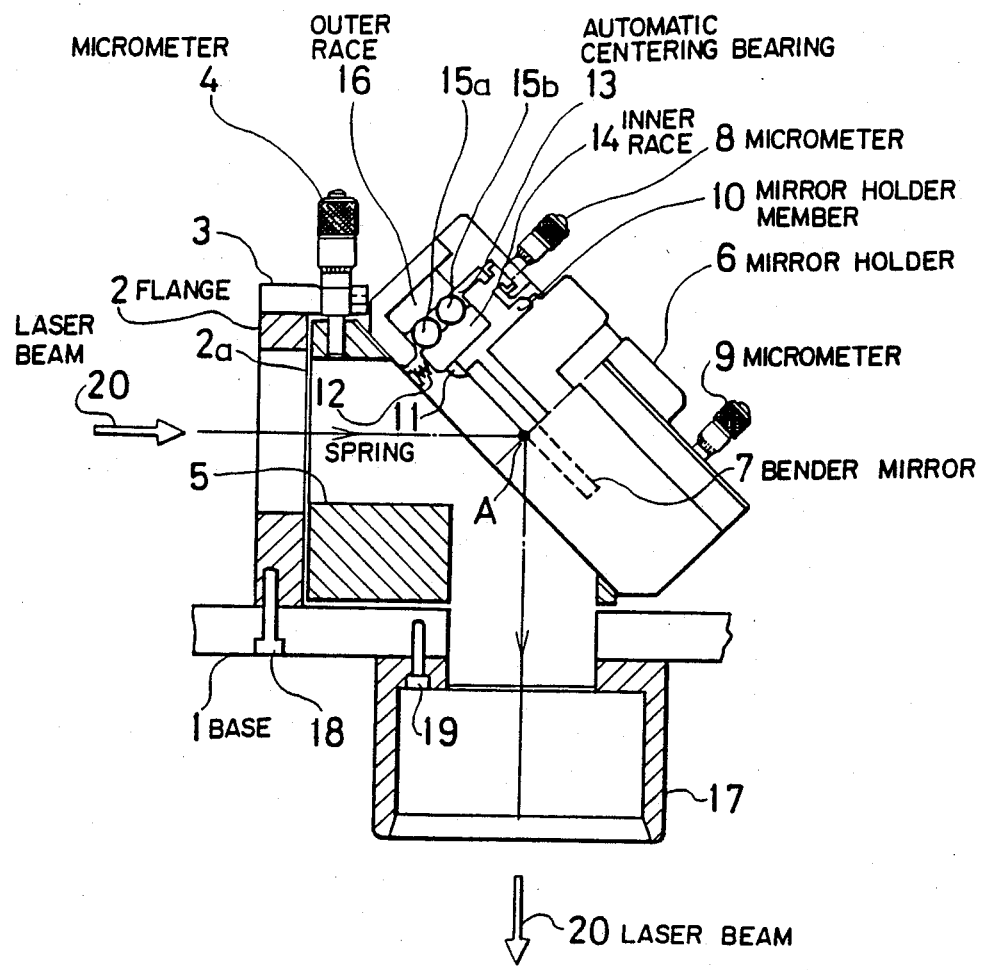
FIG. 1 is an elevational view, partly in cross section, of a beam bender according to an embodiment of the present invention.

FIG. 1 shows a beam bender according to an embodiment of the present invention. The beam bender includes a base 1 having a central hole defined therein. A flange 2 is fastened to the base 1 by a screw 18 and has a side 2a against which a light-guide member (described below) is slidably held. A micrometer 4 is fixed to a member 3 mounted on an upper surface of the flange 2. A light-guide member 5 is of an inverted L shaped and has a hollow structure for allowing a laser beam 20 to pass therethrough. The light-guide member 5 has a surface held vertically slidably against the side 2a of the flange 2, and can be slid vertically by the micrometer 4.

A mirror holder 6 is fixed to the light-guide member 5 and houses a bender mirror 7 therein. The mirror holder 6 is adjustable in small angular increments with respect to the light-guide member 5 by means of micrometers 8, 9 to adjust the angle of the bender mirror 7 for adjusting the guide passage for the laser beam 20 in the light-guide member 5.

The mirror holder 6 has therein a mirror holder member 10 with the bender mirror 7 being fixed to the lower surface of the mirror holder 10 by means of an O-ring 11. The mirror holder member 10 is fitted in an inner bearing race 14 of an automatic centering bearing 13. The mirror holder member 10 has one end held against a spring 12, and can be moved in the axial direction o the micrometer 8 by rotating the micrometer 8. Since the mirror holder member 10 is fitted in the inner race 14 of the automatic centering bearing 13 and held in contact with an outer bearing race 16 thereof through balls 15a, 15b, the mirror holder member 10 is movable along the inner spherical surface of the outer race 16. Micrometer 9 works in a manner similar to micrometer 8. Thus, the angle of inclination of the bender mirror 7 can be varied about a center A of the reflecting surface of the bender mirror 7.

Therefore, the angle of inclination of the bender mirror 7 about the center A in the plane of the sheet of FIG. 1 can be varied by adjusting the micrometers 8, 9.

Figure 2:
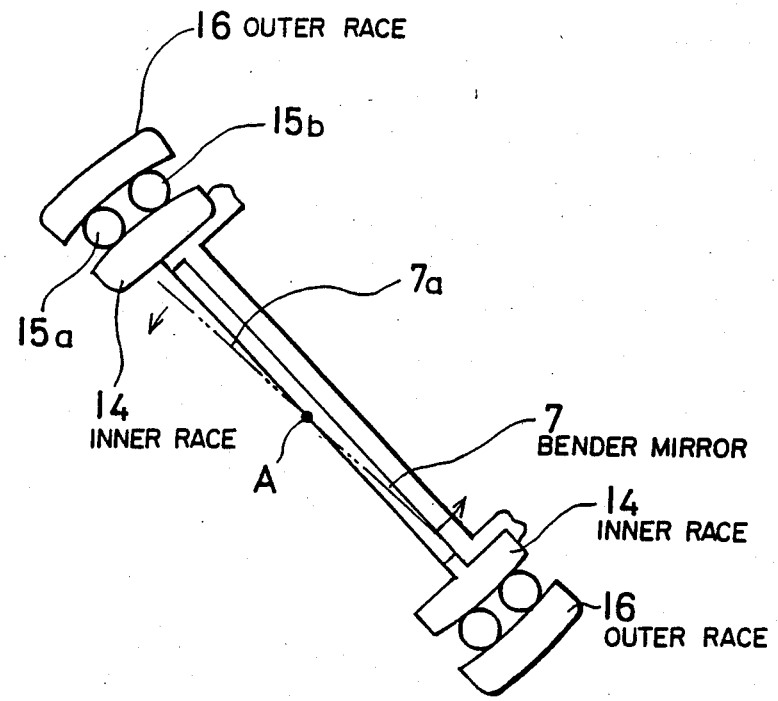
FIG. 2 is a view showing in detail the manner in which the angle of inclination of a bender mirror is varied.

Such angular adjustment is shown in detail in FIG. 2. Those parts shown in FIG. 2 which are identical to those of FIG. 1 are denoted by identical reference numerals, and will not be described in detail. When the bender mirror 7 is moved by the micrometer 8, the movement of the bender mirror 7 is confined by the fixed outer race 16 of the automatic centering bearing 13. The inner race 14 moves along the inner spherical surface of the outer race 16 through the balls 15a, 15b in circular motion about the center A of the spherical surface of the outer race 16. Such circular motion is effected not only in the plane of the sheet of FIG. 1 but also in a plane normal to the sheet of FIG. 1. Denoted at 7a is a position to which the reflecting surface of the bender mirror 7 is displaced.

Although not shown, two micrometers identical to the micrometers 8, 9 are disposed in positions spaced in the direction normal to the plane of the sheet of FIG. 1. Therefore, the angle of inclination of bender mirror 7 can be varied in the plane of the sheet of FIG. 1 and also in the plane normal to the sheet of FIG. 1.

Inasmuch as the angle of inclination of the bender mirror 7 can be adjusted in the plane of the sheet of FIG. 1 and the plane normal to the sheet of FIG. 1 without varying the position of the center A of the bender mirror 7, the angle of inclination of the bender mirror 7 can be adjusted easily and effectively.

After the bender mirror 7 has been adjusted positionally, the mirror holder 6 can be vertically moved in its entirety by the micrometer 4, for example.

The angular adjustment of the bender mirror 7 is simplified since the angle of inclination of the bender mirror 7 can be carried out without varying the position of the center A bender mirror 7.

A flange 17 is fastened to the lower surface of the base 1 by means of a screw 19. A cooling structure for the bender mirror 7 is omitted from illustration.

In the above embodiment, the automatic centering bearing is employed to cause the mirror holder member to effect concentric circular motion about a certain point. However, the present invention is not limited to the automatic centering bearing, but may employ another structure to allow the mirror holder member to effect the same motion. For example, the inner and outer races may be slid directly against each other without the intermediary of any balls.

Three micrometers may be employed rather than the four micrometers.

With the present invention, as described above, the mirror holder member holding the bender mirror is confined by the inner spherical surface of the outer race so as to be movable about the center of the reflecting surface of the bender mirror. Consequently, one point on the surface of the bender mirror remains immovable, and only the angle of inclination of the bender mirror is adjustable about that point through a simple adjustment process.

I claim:

1. A beam bender for changing the direction of a laser beam in a laser-beam machining apparatus, comprising:
   a light-guide member through which a laser beam passes;
   a mirror holder fixed to said light-guide member;
   a bender mirror having a reflecting surface mounted in said mirror holder for bending the path of said laser beam;
   a fine adjustment mechanism for adjusting the angle of inclination of said bender mirror;
   a mirror holder member in said mirror holder for holding said bender mirror;
   an inner bearing race in which said mirror holder member is fitted, said inner bearing race having an outer spherical surface; and
   an outer bearing race coupled to said inner bearing race and having an inner spherical surface, said inner spherical surface being spherically rotatable with respect to said outer bearing race about a point on the central axis of said inner bearing race, said point being aligned with the center of said reflecting surface of said bender mirror.

2. A beam bender according to claim 1, wherein said outer bearing race is coupled to said inner bearing race directly.

3. A beam bender according to claim 1, wherein said outer bearing race is coupled to said inner bearing race through balls.

4. A beam bender according to claim 3, wherein said inner bearing race, said balls and said outer bearing race constitute an automatic centered bearing.

5. A beam bender according to claim 1, wherein said fine adjustment mechanism includes a plurality of micrometers.

6. A beam bender according to claim 1, wherein one end of said mirror holder member is spring biased.

* * * * *

UNITED STATES PATENT AND TRADEMARK OFFICE
CERTIFICATE OF CORRECTION

PATENT NO. : 4,910,378
DATED : March 20, 1990
INVENTOR(S) : TAKEJI ARAI

It is certified that error appears in the above-identified patent and that said Letters Patent is hereby corrected as shown below:

Column 4, line 18, "spherical surface" should be --bearing race--;

Signed and Sealed this

Second Day of April, 1991

*Attest:*

HARRY F. MANBECK, JR.

*Attesting Officer*      *Commissioner of Patents and Trademarks*